United States Patent
Choi et al.

(10) Patent No.: US 12,100,345 B2
(45) Date of Patent: Sep. 24, 2024

(54) REDUCING SCREEN CORNER BEZEL SIZE

(71) Applicant: Google LLC, Mountain View, CA (US)

(72) Inventors: Sangmoo Choi, Palo Alto, CA (US); Adrian Gheorghe Manea, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/274,900

(22) PCT Filed: Aug. 27, 2020

(86) PCT No.: PCT/US2020/048132
§ 371 (c)(1),
(2) Date: Mar. 10, 2021

(87) PCT Pub. No.: WO2021/045954
PCT Pub. Date: Mar. 11, 2021

(65) Prior Publication Data
US 2022/0415250 A1 Dec. 29, 2022

Related U.S. Application Data

(60) Provisional application No. 62/895,117, filed on Sep. 3, 2019.

(51) Int. Cl.
*G09G 3/3208* (2016.01)
*G09G 3/20* (2006.01)
(Continued)

(52) U.S. Cl.
CPC ......... *G09G 3/3208* (2013.01); *G09G 3/2092* (2013.01); *G09G 3/3225* (2013.01);
(Continued)

(58) Field of Classification Search
CPC ......... G09G 3/3266; G09G 2310/0286; G09G 2300/0408; G09G 3/3225;
(Continued)

(56) References Cited

U.S. PATENT DOCUMENTS 8,098,225 B2   1/2012   Murakami et al.
9,052,538 B2   6/2015   Lee et al.
(Continued)

FOREIGN PATENT DOCUMENTS

CN   101295081   10/2008
CN   205158884    4/2016
(Continued)

OTHER PUBLICATIONS

PCT International Search Report and Written Opinion in International Appln. No. PCT/US2020/048132, dated Dec. 3, 2020, 15 pages.

(Continued)

*Primary Examiner* — Dismery Mercedes
(74) *Attorney, Agent, or Firm* — Fish & Richardson P.C.

(57) ABSTRACT

A display panel includes an array of pixels extending in a plane and arranged in rows, wherein a first plurality of the rows extend to an edge of the pixel array and one or more rows at a corner of the pixel array are recessed from the edge. The display panel includes driver circuits each connected to a corresponding row of the pixel array and occupying an area in the plane, the area having a long dimension and an orthogonal short dimension. A first set of driver circuits are connected to corresponding rows of the first plurality of rows and a second set of driver circuits are connected to corresponding rows at the corner of the pixel array. The long dimension of each of the drivers of the first set of drivers is greater than the long dimension of each of the drivers of the second set of drivers.

15 Claims, 5 Drawing Sheets

(51) Int. Cl.
  *G09G 3/3225* (2016.01)
  *G02F 1/1362* (2006.01)
  *G09G 3/3266* (2016.01)

(52) U.S. Cl.
  CPC ..... *G02F 1/136286* (2013.01); *G09G 3/3266* (2013.01); *G09G 2300/0408* (2013.01); *G09G 2300/0413* (2013.01); *G09G 2310/0286* (2013.01); *G09G 2310/0291* (2013.01)

(58) Field of Classification Search
  CPC .......... G09G 2310/0264; G09G 3/2092; G02F 1/13454; G02F 1/136286; G02F 1/1368
  See application file for complete search history.

(56) References Cited

U.S. PATENT DOCUMENTS

| | | | | |
|---|---|---|---|---|
| 10,600,360 | B2* | 3/2020 | Nonaka | H10K 59/121 |
| 11,322,574 | B2* | 5/2022 | Kawamura | G09G 3/3258 |
| 2008/0266210 | A1 | 10/2008 | Nonaka | |
| 2016/0240141 | A1* | 8/2016 | Lee | G09G 3/20 |
| 2016/0247478 | A1* | 8/2016 | Ishige | G02F 1/1345 |
| 2017/0337873 | A1* | 11/2017 | Kim | G09G 3/3233 |
| 2018/0040683 | A1* | 2/2018 | Matsueda | H10K 59/131 |
| 2018/0075810 | A1* | 3/2018 | Kim | G09G 3/3266 |
| 2018/0322837 | A1* | 11/2018 | Sakurai | G02F 1/13452 |
| 2019/0043892 | A1 | 2/2019 | Lee et al. | |
| 2019/0103049 | A1 | 4/2019 | Noh et al. | |
| 2020/0135764 | A1* | 4/2020 | Ha | G02F 1/1345 |
| 2020/0379523 | A1* | 12/2020 | Horiuchi | G06F 1/189 |
| 2021/0003897 | A1* | 1/2021 | Yu | G02F 1/136286 |
| 2021/0027716 | A1* | 1/2021 | Yamada | G09G 3/3266 |
| 2021/0256913 | A1* | 8/2021 | Hao | G09F 9/30 |
| 2021/0327336 | A1* | 10/2021 | Wang | G09G 3/20 |

FOREIGN PATENT DOCUMENTS

| | | |
|---|---|---|
| CN | 106960658 | 7/2017 |
| CN | 107689210 | 2/2018 |
| CN | 107818751 | 3/2018 |
| CN | 108682372 | 10/2018 |
| CN | 110136632 | 8/2019 |

OTHER PUBLICATIONS

PCT International Preliminary Report on Patentability in International Appln No. PCT/US2020/048132, dated Mar. 17, 2022, 10 pages.

Office Action in European Appln. No. 20786782.3, dated Mar. 13, 2023, 9 pages.

Office Action in Chinese Appln. No. 202080047786.6, mailed on Mar. 19, 2024, 34 pages (with English translation).

* cited by examiner

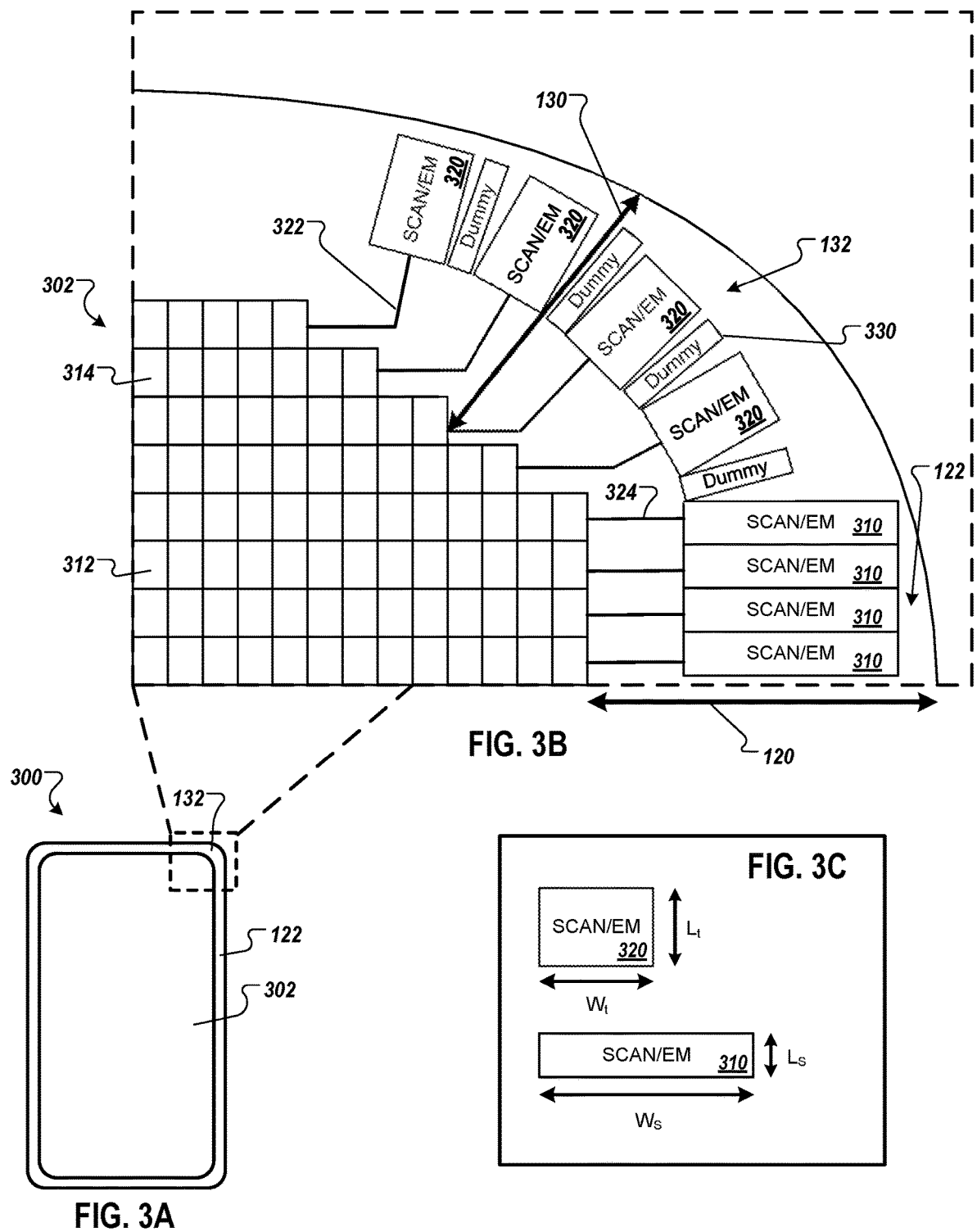

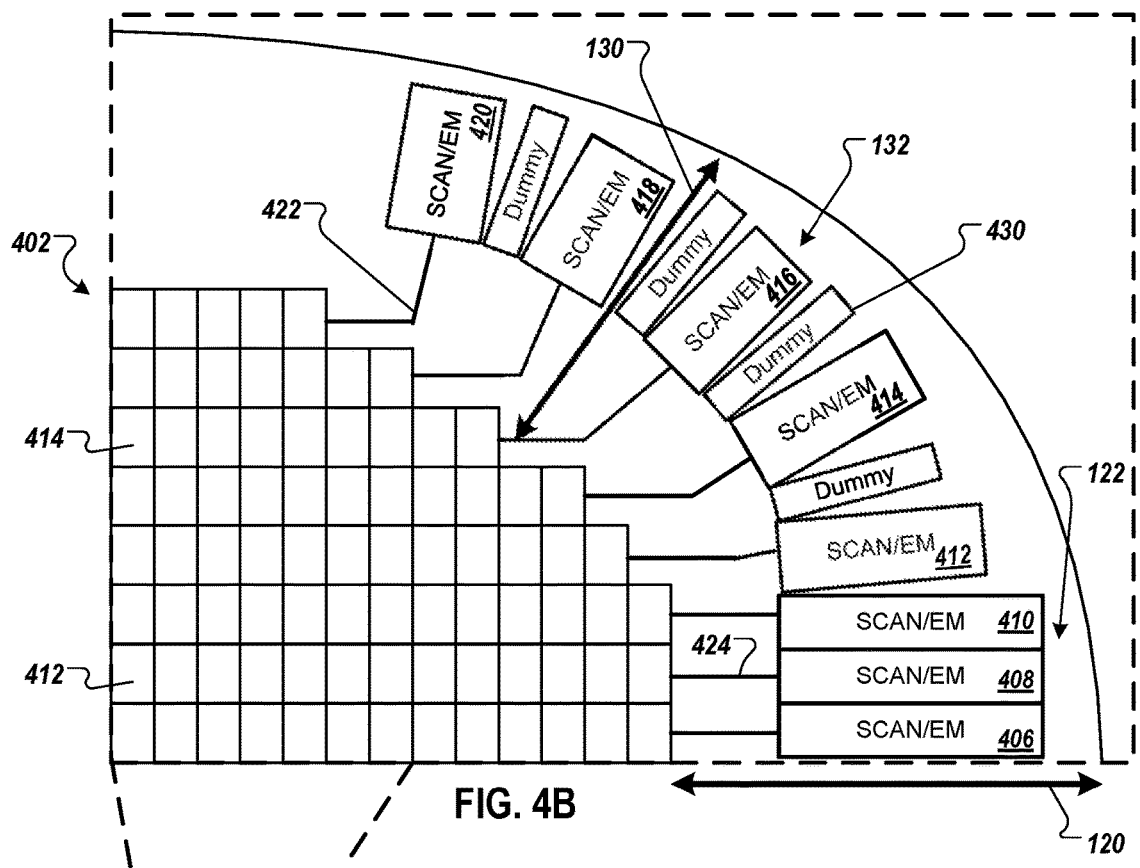
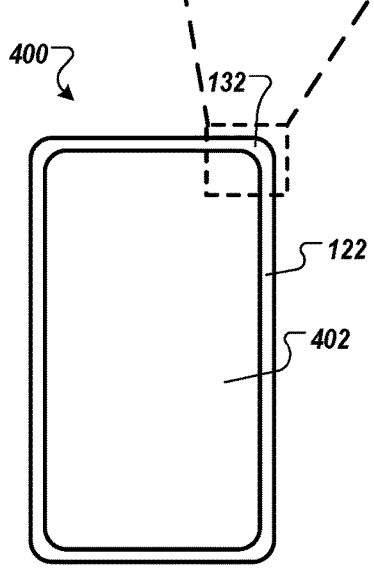
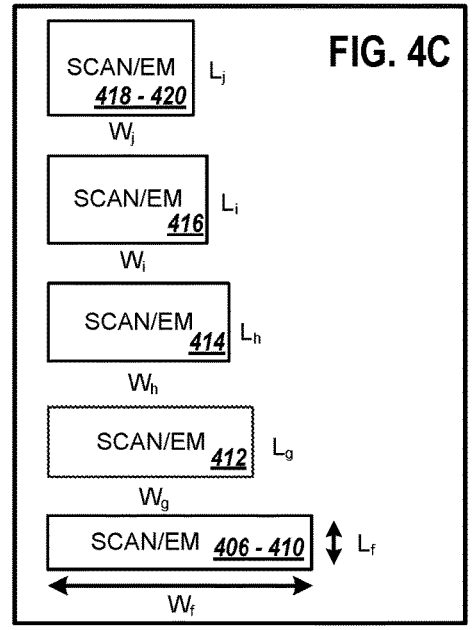
FIG. 4B
FIG. 4A
FIG. 4C

REDUCING SCREEN CORNER BEZEL SIZE

CROSS-REFERENCE TO RELATED APPLICATION

This application is a National Stage Application under 35 U.S.C. § 371 and claims the benefit of International Application No. PCT/US2020/048132, filed Aug. 27, 2020, which claims the benefit of U.S. Application No. 62/895,117, filed Sep. 3, 2019, which is incorporated by reference in its entirety.

TECHNICAL FIELD

This specification relates generally to flat panel displays.

BACKGROUND

Electronic devices may include flat panel displays on which visual images may be shown. For example, a user of an electronic device may view visual images on a flat panel display while watching a video or playing a video game. Electronic devices may include a bezel surrounding the flat panel display.

SUMMARY

An electronic device may include a display panel that includes a pixel array of light emitting pixels. The electronic device may include sets of driver circuits surrounding the pixel array. Each driver circuit may send signals to a row of the pixel array through signal lines. The driver circuits may each occupy an area that includes a long dimension, or width, and a short dimension, or length.

The electronic device may include a bezel that surrounds the display panel and covers the driver circuits and the signal lines. A display active area is typically defined as the area of a pixel array, which can reproduce images on the screen. The bezel is the area that does not have any active emitting pixels, and is typically defined as the area between outer boundary of the display active area and the edge of the display panel/the edge of the electronic device. The size of the bezel may be based on the width of the driver circuits, and the length of the signal lines. The bezel may include straight regions, or sides, and rounded regions, or corners.

In some examples, the signal lines in the corner regions of the bezel may include a horizontal segment and an angled segment. The signal lines in the side regions of the bezel may include only a horizontal segment. The differences in the traces of the signal lines may result in the corner regions of the bezel having greater widths compared to the side regions of the bezel.

To reduce the width of the corner regions of the bezel, the size of the driver circuits can be reduced. Specifically, the width of the driver circuits can be reduced, while the length of the driver circuits can be increased. By reducing the width of the driver circuits, the corner bezel size can be reduced. Reducing corner bezel size can result in a greater size of the display active area in the panel, and a corresponding higher screen to body ratio in the electronic device.

In general, one innovative aspect of the subject matter described in this specification can be embodied in a display panel that includes an array of pixels extending in a plane and arranged in rows. A first plurality of the rows extend to an edge of the pixel array and one or more rows at a corner of the pixel array are recessed from the edge. The display panel includes driver circuits each connected to a corresponding row of the pixel array and occupying an area in the plane, the area having a long dimension and an orthogonal short dimension. A first set of driver circuits are connected to corresponding rows of the first plurality of rows and a second set of driver circuits are connected to corresponding rows at the corner of the pixel array. The long dimension of each of the drivers of the first set of drivers is greater than the long dimension of each of the drivers of the second set of drivers.

In general, one innovative aspect of the subject matter described in this specification can be embodied in a display panel that includes an array of pixels extending in a plane and arranged in a plurality of rows, a first plurality of the rows extending to an edge of the pixel array and one or more rows at a corner of the pixel array recessed from the edge of the pixel array; a plurality of driver circuits each connected to a corresponding row of the pixel array and occupying a corresponding area in the plane, the corresponding area having a long dimension and a short dimension orthogonal to the long dimension, the plurality of driver circuits including a first set of driver circuits and a second set of driver circuits, the first set of drivers being connected to corresponding rows of the first plurality of rows and the second set of drivers being connected to corresponding rows of the one or more rows at the corner of the pixel array recessed from the edge, the long dimension of each of the drivers of the first set of drivers being greater than the long dimension of each of the drivers of the second set of drivers.

In general, one innovative aspect of the subject matter described in this specification can be embodied in a display system that includes an array of light emitting pixels; a bezel surrounding the array of light emitting pixels; the bezel including a straight region and a corner region; a first set of driver circuits connected to the array of light emitting pixels and located within the straight region; each of the first set of driver circuits having a length and a width; and a second set of driver circuits connected to the array of light emitting pixels and located within the corner region; each of the second set of driver circuits having a length and a width; the width of each of the second set of driver circuits being less than the width of each of the first set of driver circuits.

The foregoing and other embodiments can each optionally include one or more of the following features, alone or in combination.

In some implementations, the display panel may include one or more intervening sets of driver circuits each connected to intervening corresponding rows of the pixel array. The intervening corresponding rows are positioned in between the first plurality of rows and the one or more rows at the corner of the pixel array recessed from the edge. The long dimension of each of the drivers of the intervening sets of drivers is less than the long dimension of each of the drivers of the first set of drivers, and greater than the long dimension of each of the drivers of the second set of drivers.

In some implementations, the display panel is housed in a chassis defining a bezel covering the plurality of driver circuits.

In some implementations, the orientation of the long dimension of each of the drivers of the first set of drivers is parallel to the direction of the corresponding rows.

In some implementations, the orientation of the long dimension of each of the drivers of the second set of drivers is offset from the orientation of the long dimension of each of the drivers of the first set of drivers by a non-zero angle.

In some implementations, each driver circuit provides each of a scan signal and an emission signal to the corresponding row of the pixel array.

In some implementations, the pixel array includes an array of organic light emitting diodes.

In some implementations, the display panel may include a display system including a bezel surrounding the array of pixels, the bezel including a straight region extending in a first direction and a corner region. The first set of driver circuits may be located within the straight region. The second set of driver circuits may be located within the corner region. Each of the first set of driver circuits may have a length and a width. Each of the second set of driver circuits may have a length and a width. The width of each of the second set of driver circuits may be less than the width of each of the first set of driver circuits.

In some implementations, the array of light emitting pixels is arranged in a plurality of rows. Each driver circuit of the first set of driver circuits and the second set of driver circuits is connected to a corresponding row of the array of light emitting pixels.

In some implementations, the length of each driver circuit of the first set of driver circuits and the second set of driver circuits is shorter than the width of the driver circuit.

In some implementations, an orientation of the length of each driver circuit of the first set of driver circuits and the second set of driver circuits is orthogonal to an orientation of the width of the driver circuit.

In some implementations, an orientation of the length of the first set of driver circuits is parallel to the first direction.

In some implementations, the first set of driver circuits and the second set of driver circuits may each include driver circuits providing each of a scan signal and an emission signal to a portion of the array of light emitting pixels.

In some implementations, the array of light emitting pixels may include an array of organic light emitting diodes (OLEDs).

Implementations of the above techniques include apparatus, systems, and devices. One such device is a mobile device including the above-described display system or display panel.

In some implementations, the mobile device may include a housing; and a display panel or a display system.

In some implementations, the housing defines a bezel covering the plurality of driver circuits.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A to 3C illustrate an example for reducing screen corner bezel size using two sizes of scan/emission drivers.

FIGS. 4A to 4C illustrate an example for reducing screen corner bezel size using multiple graduating sizes of scan/emission drivers.

Like reference numbers and designations in the various drawings indicate like elements.

DETAILED DESCRIPTION

Figure 1:
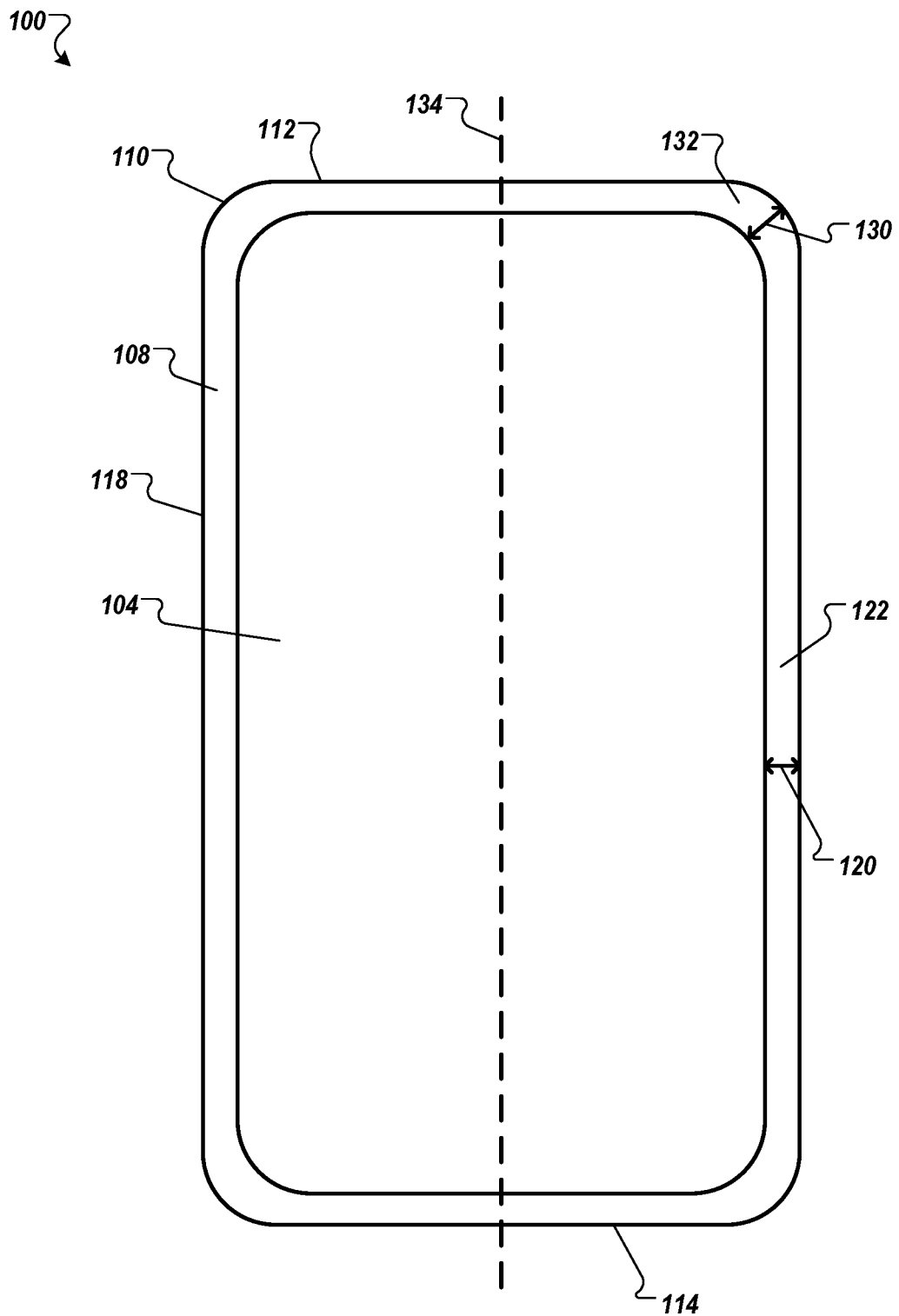
FIG. 1 is a diagram of an example electronic device with a display panel and a bezel.

FIG. 1 is a diagram of an example display panel 100 with a display active area 104 and a bezel 108. The display panel 100 may be assembled in electronic devices, for example, a smart phone, a television, a smart watch, or a handheld game console. The display panel 100 includes an array of light emitting pixels. The display panel 100 may be, for example, an active matrix organic light emitting diode (OLED) panel, or a light emitting diode (LED) liquid crystal displays (LCD) panel. The display panel 100 may be housed in a chassis. The chassis may be referred to as a housing.

The display panel 100 includes a top edge 112, right and left side edges 118, and a bottom edge 114. The display panel 100 also includes right and left side top corners 110. The display panel 100 includes a bezel 108. The bezel 108 is the area between the edge of the display panel 100 and the edge of the display active area 104. The bezel 108 surrounds the array of light emitting pixels of the display panel 100, The bezel 108 can include the driver circuits for the display panel 100, the power supply lines, and the signal lines between the display control circuits and the integrated driver circuits or pixels.

The bezel 108 may have multiple regions with varying widths. The bezel 108 may include straight regions and corner regions. For example, the bezel 108 includes a side bezel 122 that is a straight region. The side bezel 122 has a side bezel width 120. The bezel 108 includes a corner bezel 132 that is a corner region. The corner bezel 132 has a corner bezel width 130. In some examples, the corner bezel width 130 may be greater than the side bezel width 120, due to differences in the traces of signal lines between driver circuits and the display panel 104.

The display panel 100 may be symmetrical about the vertical axis 134. For example, the right side bezel may have the same width as the left side bezel, and the right side corner bezel may have the same size width as the left side bezel.

Figure 2:
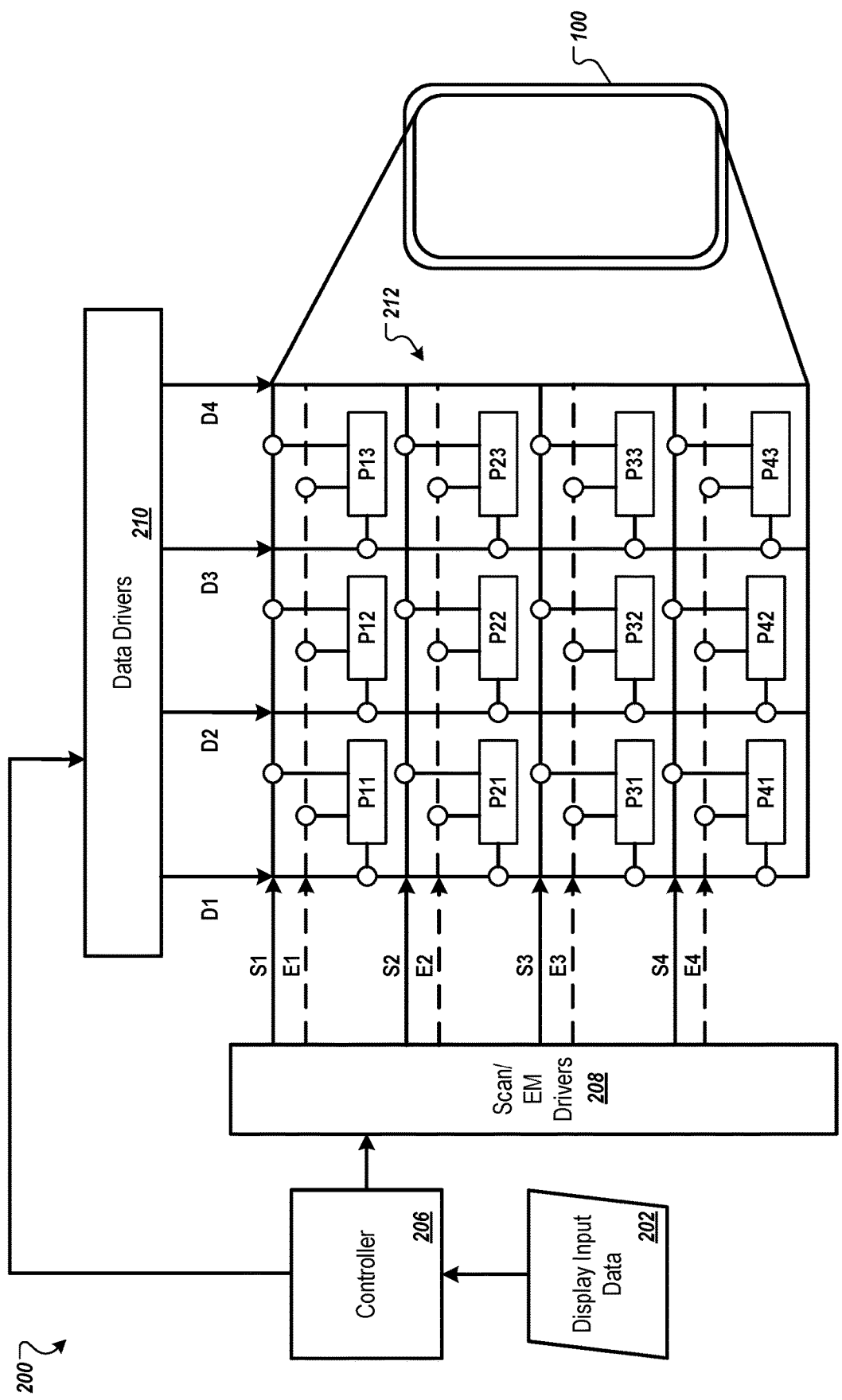
FIG. 2 is a diagram of a display system of an electronic device.

FIG. 2 is a diagram of an example display system 200 of a display panel. For example, FIG. 2 may illustrate the display system 200 of the display panel 100, The display system 200 is an OLED display system that includes an array 212 of light emitting pixels. Each light emitting pixel includes an OLED. The OLED display is driven by drivers including scan/emission drivers 208 and data drivers 210. In general, the scan/emission drivers 208 selects a row of pixels in the display, and the data drivers 210 provide data signals (e.g. voltage data) to the pixels in the selected row to light the selected OLEDs according to the image data. Signal lines such as scan lines, emission lines, and data lines may be used in controlling the pixels to display images on the display. Though FIG. 2 illustrates the display system 200 having the scan/emission drivers 208 on one side, the scan/emission drivers 208 can be placed on both left and right sides of the display improving the driving performance (e.g. speed).

The display system 200 includes the pixel array 212 that includes a plurality of light emitting pixels, e.g., the pixels P11 through P43. A pixel is a small element on a display that can change color based on the image data supplied to the pixel. Each pixel within the pixel array 212 can be addressed separately to produce various intensities of color. The pixel array 212 extends in a plane and includes rows and columns. A row extends horizontally across the array. For example, the first row of the pixel array 212 includes pixels P11, P12, and P1.3. A column extends vertically down the display. For example, the first column of the pixel array 212 includes pixels 111, P21, P31, and P41. Only a few pixels are shown in FIG. 2 for simplicity. In practice, there may be several million pixels in the pixel array 212. Greater numbers of pixels can result in higher image resolution.

The display system 200 includes scan/emission drivers 208 and data drivers 210. The scan/emission drivers 208 are integrated, i.e., stacked, row line drivers that supply signals to rows of the pixel array 212. For example, the scan/emission drivers 208 supply scan signals S1 to S4, and emission signals E1 to E4, to the rows of pixels. The data drivers 210 supply signals to columns of the pixel array 212. For example, the data drivers 210 supply data signals D1 to D4 to the columns of pixels.

Each pixel in the pixel array 212 is addressable by a horizontal scan line and emission line, and a vertical data line. For example, the pixel P11 is addressable by the scan line S1, the emission line E1, and the data line D1. In another example, the pixel P32 is addressable by the scan line S3, the emission line E3, and the data line D2.

The display system 200 includes a controller 206 that receives display input data 202. The controller 206 may include a graphic controller and a timing controller. The controller generates the timing of the signals for delivery to the display. The controller 206 provides the input signals (e.g. clock signals, start pulses) to the scan/emission drivers 208, and the image data to the data drivers 210.

The scan/emission drivers 208 and the data drivers 210 provide signals to the pixels enabling the pixels to reproduce the image on the display. The scan/emission drivers 208 and the data drivers 210 provide the signals to the pixels via the scan lines, the emission lines, and the data lines. To provide the signals to the pixels, the scan/emission drivers 208 select a scan line and control the emission operation of the pixels. The data drivers 210 provides data signals to the pixels addressable by the selected scan line to light the selected OLEDs according to the image data.

Although FIG. 2 illustrates an OLED display, the technique for reducing screen corner bezel size may be applied to any flat panel display that includes an array of pixels. For example, the technique for reducing screen corner bezel size may be applied to light emitting diode (LED) liquid crystal displays (LCD) and plasma display panels (PDP).

FIGS. 3A to 3C illustrate an example for reducing screen corner bezel size using two sizes of scan/emission drivers. FIG. 3A illustrates a display panel 300 with a display system that reduces screen corner bezel size. The display panel 300 includes a pixel array 302. FIG. 3B illustrates a detailed view of the top right corner of the display panel 300, including the top right portion of the pixel array 302. FIG. 3C illustrates the relative dimensions of the scan/emission drivers in the bezel of the display panel 300.

Although FIG. 3A and FIG. 3B illustrate the top right corner of the display panel 300, the technique for reducing screen corner bezel size can also be applied to other corner regions of the display panel 300, e.g., the top left corner.

FIG. 3B shows the upper right portion of the pixel array 302 at the top corner of the display panel 300. The upper right portion of the pixel array 302 includes multiple rows of pixels. Certain rows of pixels extend to the edge of the pixel array 302. For example, the pixel row 312 extends to the right edge of the pixel array 302. Certain rows of pixels are recessed from the edge of the pixel array 302. For example, the pixel row 314 is recessed from the right edge of the pixel array 302.

FIG. 3B shows the straight region of the bezel, i.e., the side bezel 122, and the corner region of the bezel, i.e., the corner bezel 132. FIG. 3B shows the region of the bezel where the side bezel 122 meets the corner bezel 132. The side bezel 122 has a side bezel width 120. The corner bezel 132 has a corner bezel width 130.

In FIG. 3B, there are two sets of scan/emission (SCAN/EM) driver circuits. Each SCAN/EM driver of each set of SCAN/EM driver circuits connects to the pixel array 302. For example, each SCAN/EM driver can provide a scan signal and an emission signal to one row of pixels within the pixel array 302. The SCAN/EM drivers transmit the scan signals and the emission signals through signal lines 322, 324. The signal lines 322, 324 can each include both a scan line and an emission line.

The driver circuits of a first set of driver circuits are located within the straight region of the bezel, e.g., the side bezel 122. The first set of driver circuits includes the side SCAN/EM drivers 310. The rows of pixels driven by the first set of driver circuits may be referred to as a first plurality of rows, and may include rows (e.g. row 312) which extend to an edge of the pixel array 302. The driver circuits of a second set of driver circuits are located within the corner region of the bezel, e.g., the corner bezel 132. The second set of driver circuits includes the corner SCAN/EM drivers 320. Rows of pixels driven by the second set of driver circuits (e.g. row 314) may be referred to as one or more rows at a corner of the pixel array which are recessed from the edge of the pixel array 302.

The side SCAN/EM drivers 310 and the corner SCAN/EM drivers 320 each occupy an area in the same plane as the pixel array 302. As shown in FIG. 3C, the area can be defined by a long dimension W, and a short dimension L, where the short dimension L is orthogonal to the long dimension W. The long dimension of the side SCAN/EM drivers is parallel to the row direction of the pixel array 302. The short dimension of the side SCAN/EM drivers is orthogonal to the row direction of the pixel array 302. The long dimension of each of the corner SCAN/EM drivers is offset from the orientation of the long dimension of the side SCAN/EM drivers by a non-zero angle that is generally up to 90°. The offset angle, which refers to the angle by which the long dimension of a corner SCAN/EM driver is rotated relative to the long dimension of the side SCAN/EM drivers, may increase with each corner SCAN/EM driver that is positioned at a greater distance from the side SCAN/EM drivers.

The side SCAN/EM drivers 310 each have a long dimension with a width $W_S$, and a short dimension with a length $L_S$. The side SCAN/EM drivers 310 each transmit a scan signal and an emission signal to a corresponding row of pixels through a signal line 324. The signal line 324 may include only a horizontal segment, and may be parallel to the long dimension of the SCAN/EM drivers 310.

The corner bezel 132 includes corner SCAN/EM drivers 320. As shown in FIG. 3C, the corner SCAN/EM drivers 320 each have a long dimension with a width $W_t$, and a short dimension with a length $L_t$. The side SCAN/EM driver width $W_S$ is greater than the corner SCAN/EM driver width $W_t$. The corner SCAN/EM driver length $L_t$ is greater than the side SCAN/EM driver length $L_S$. For example, the SCAN/EM driver width $W_S$ may be between 10 micron (μm) and 500 μm greater than the corner SCAN/EM driver width $W_t$. Similarly, the corner SCAN/EM driver length $L_t$ may be between 10 μm and 200 μm greater than the side SCAN/EM driver length $L_S$.

The corner SCAN/EM drivers 320 each transmit the scan signal and the emission signal to a corresponding row of pixels through a signal line 322. The signal line 322 may be shaped according to the position of the corner SCAN/EM 320 driver within the corner bezel 132. For example, the signal line 322 may include a horizontal segment that is parallel to the direction of the pixel rows, and an angled segment that connects to the SCAN/EM driver 320. Because of the angled signal lines 322 in the corner bezel 132, the corner region typically requires a greater corner bezel width 130 compared to the side bezel width 120.

The corner bezel 132 includes both the SCAN/EM drivers 320 and dummy drivers 330 in order to optimize the location of the SCAN/EM drivers 320 according to the corresponding pixel array 302 positions. The dummy drivers 330 do not operate, but each occupy an area of the plane in order to maintain similar pattern density of each layer in the corner region during the display panel fabrication. The corner bezel 132 includes dummy drivers 330 in between each SCAN/EM driver 320, or between groups of SCAN/EM drivers 320, where a group includes two or more SCAN/EM drivers 320. In some examples, the corner bezel may include more than one dummy driver 330 in between each of the corner SCAN/EM drivers 320 or groups of SCAN/EM drivers 320. The dummy drivers 330 are used for spacing between the corner SCAN/EM drivers 320. Reducing the number of dummy drivers 330 allows for corner SCAN/EM drivers 320 with greater lengths $L_t$. Corner SCAN/EM drivers 320 with greater lengths $L_t$ can include the required circuitry within an area $L_t \times W_t$ defined by shorter widths $W_t$. Corner SCAN/EM drivers 320 with shorter widths $W_t$ result in smaller corner bezel widths 130.

The corner SCAN/EM 320 drivers in the corner bezel 132 have a shorter width $W_t$ and a longer length $L_t$ compared to the side SCAN/EM drivers 310 in the side bezel 122. The corner bezel width 130 is based on the combined length of the signal lines 322 and the width $W_t$ of the corner SCAN/EM drivers 320. Thus, the shorter width $W_t$ and longer length $L_t$ result in a narrower corner bezel width 130. As a result of including two sizes of SCAN/EM drivers 310, 320, the corner bezel width 130 can be the same width, or a lesser width, compared to the side bezel width 120. Reducing corner bezel size can result in the advantage of a greater size of the display panel, and a higher screen-to-body ratio in the electronic device.

FIGS. 4A to 4C illustrate an example for reducing screen corner bezel size using multiple graduating sizes of scan/emission drivers. FIG. 4A illustrates a display panel 400 with a display system that reduces screen corner bezel size. The display panel 400 includes a pixel array 402. The display panel 400 is similar to the display panel 300. The display panel 400 differs from the display panel 300 in that the display panel 300 includes two sets of driver circuits to reduce screen corner bezel size, while the display panel 400 includes multiple graduating sets of driver circuits to reduce screen corner bezel size. FIG. 4B illustrates a detailed view of the top right corner of the display panel 400, including the top right portion of the pixel array 402. FIG. 4C illustrates the relative dimensions of the SCAN/EM drivers in the bezel of the electronic device 400.

Although FIGS. 4A and 4B illustrate the top right corner of the display panel 400, the technique for reducing screen corner bezel size can also be applied to other corner regions of the display panel 400, e.g., the top left corner.

FIG. 4B shows the upper right portion of the pixel array 402 at the top corner of the display panel 400. The upper right portion of the pixel array 402 includes multiple rows of pixels. Certain rows of pixels extend to the edge of the pixel array 402. For example, the pixel row 412 extends to the right edge of the pixel array 402. Certain rows of pixels are recessed from the edge of the pixel array 402. For example, the pixel row 414 is recessed from the right edge of the pixel array 402.

FIG. 4B shows the straight region of the bezel, i.e., the side bezel 122, and the corner region of the bezel, i.e., the corner bezel 132. FIG. 4B shows the region of the bezel where the side bezel 122 meets the corner bezel 132. The side bezel 122 has a side bezel width 120. The corner bezel 132 has a corner bezel width 130.

In FIG. 4B, there are multiple sets of SCAN/EM driver circuits. Each SCAN/EM driver of each set of SCAN/EM driver circuits connects to the pixel array 402. For example, each SCAN/EM driver can provide a scan signal and an emission signal to one row of pixels within the pixel array 402. The SCAN/EM drivers transmit the scan signals and the emission signals through signal lines 422, 424. The signal lines 422, 424 can each include both a scan line and an emission line.

Each set of SCAN/EM driver circuits may include one or more SCAN/EM driver. A first set of SCAN/EM drivers, with greater widths, are located in the side bezel 122. The rows of pixels driven by the first set of SCAN/EM drivers may be referred to as a first plurality of rows, and may include rows (e.g. row 412) which extend to an edge of the pixel array 402. A second set of SCAN/EM drivers, with lesser widths, are located in the corner bezel 132. Rows of pixels driven by the second set of SCAN/EM drivers (e.g. row 414) may be referred to as one or more rows at a corner of the pixel array which are recessed from the edge of the pixel array 402. In between the first set of SCAN/EM drivers and the second set of SCAN/EM drivers are intervening sets of SCAN/EM drivers with intermediate widths. Rows of pixels driven by the intervening sets of SCAN/EM drivers may be referred to as intervening rows and may be provided at a corner of the pixel array, and may also be recessed from the edge of the pixel array 402. The intervening sets of SCAN/EM drivers are lesser in width than the first set of SCAN/EM drivers, but greater in width than the second set of SCAN/EM drivers. The widths of the SCAN/EM drivers gradually decrease in the direction from the side bezel 122 to the corner bezel 132. Likewise, the lengths of the SCAN/EM drivers gradually increase in the direction from the side bezel 122 to the corner bezel 132.

For example, FIG. 4B shows SCAN/EM drivers 406 through 420. The SCAN/EM drivers 406 through 420 each occupy an area within the same plane as the pixel array 402. The areas occupied by the SCAN/EM drivers 406 through 420 each have a long dimension and a short dimension. The long dimensions are $W_f$ through $W_j$, while the short dimensions are $L_f$ through $L_j$. The short dimension of each SCAN/EM driver is orthogonal to the long dimension.

The side bezel 122 includes SCAN/EM drivers 406, 408, and 410. The SCAN/EM drivers 406, 408, and 410 each occupy an area having a long dimension with a width $W_f$, and a short dimension with a length $L_f$. From the side bezel 122 to the corner bezel 132, the widths of the SCAN/EM drivers gradually decrease, while the lengths of the SCAN/EM drivers gradually increase. For example, the SCAN/EM driver 412 has a width $W_g$ that is less than the width $W_f$, and a length $L_g$ that is longer than the length $L_f$. Likewise, the SCAN/EM driver 414 has a width $W_h$ that is less than the width $W_g$. The widths decrease from $W_f$ through $W_j$, such that $W_f > W_g > W_h > W_i > W_j$. The lengths increase from $L_f$ through $L_j$, such that $L_f < L_g < L_h < L_i < L_j$. For each SCAN/EM dimension $L \times W$, there may be one or more SCAN/EM drivers, each having the same dimensions. The SCAN/EM drivers 406, 408, 410 may be referred to as the first set of SCAN/EM drivers. The SCAN/EM drivers 418, 420 may be referred to as the second set of SCAN/EM drivers. The SCAN/EM drivers 412, 414, 416 may be referred to as the intervening set of SCAN/EM drivers. Of course, it will be understood that this arrangement is provided only as an example, and other arrangements of first, second and intervening sets of SCAN/EM drivers are possible.

The SCAN/EM drivers 406 through 420 each transmit a scan signal and an emission signal to a corresponding row of pixels through a signal line 422, 424. The signal lines 424 may include only a horizontal segment, and may be parallel to direction of the rows of the pixel array 402. The signal lines 422 may be shaped according to the position of the SCAN/EM driver within the corner bezel 132. For example, the signal lines 422 may each include a horizontal segment that is parallel to the direction of the pixel rows, and an angled segment that connects to a SCAN/EM driver. Because of the angled signal lines 422 in the corner bezel 132, the corner region typically requires a greater corner bezel width 130 compared to the side bezel width 120. Similar to the electronic device 300, the display panel 400 includes dummy drivers 430 for spacing between the SCAN/EM drivers in the corner bezel 132. Reducing the number of dummy drivers 430 allows for SCAN/EM drivers with greater lengths. Corner SCAN/EM drivers with greater lengths can include the required circuitry within an area defined by shorter widths.

The corner bezel width 130 is based on the combined length of the signal lines 422 and the width of the SCAN/EM drivers in the corner bezel 132. Thus, the shorter width W and longer length L result in a narrower corner bezel width 130. As a result of including multiple graduating sizes of SCAN/EM drivers 406-420, the corner bezel width 130 can be the same width, or a lesser width, compared to the side bezel width 120. Reducing corner bezel size can result in the advantage of a greater size of the display panel.

Figure 5:
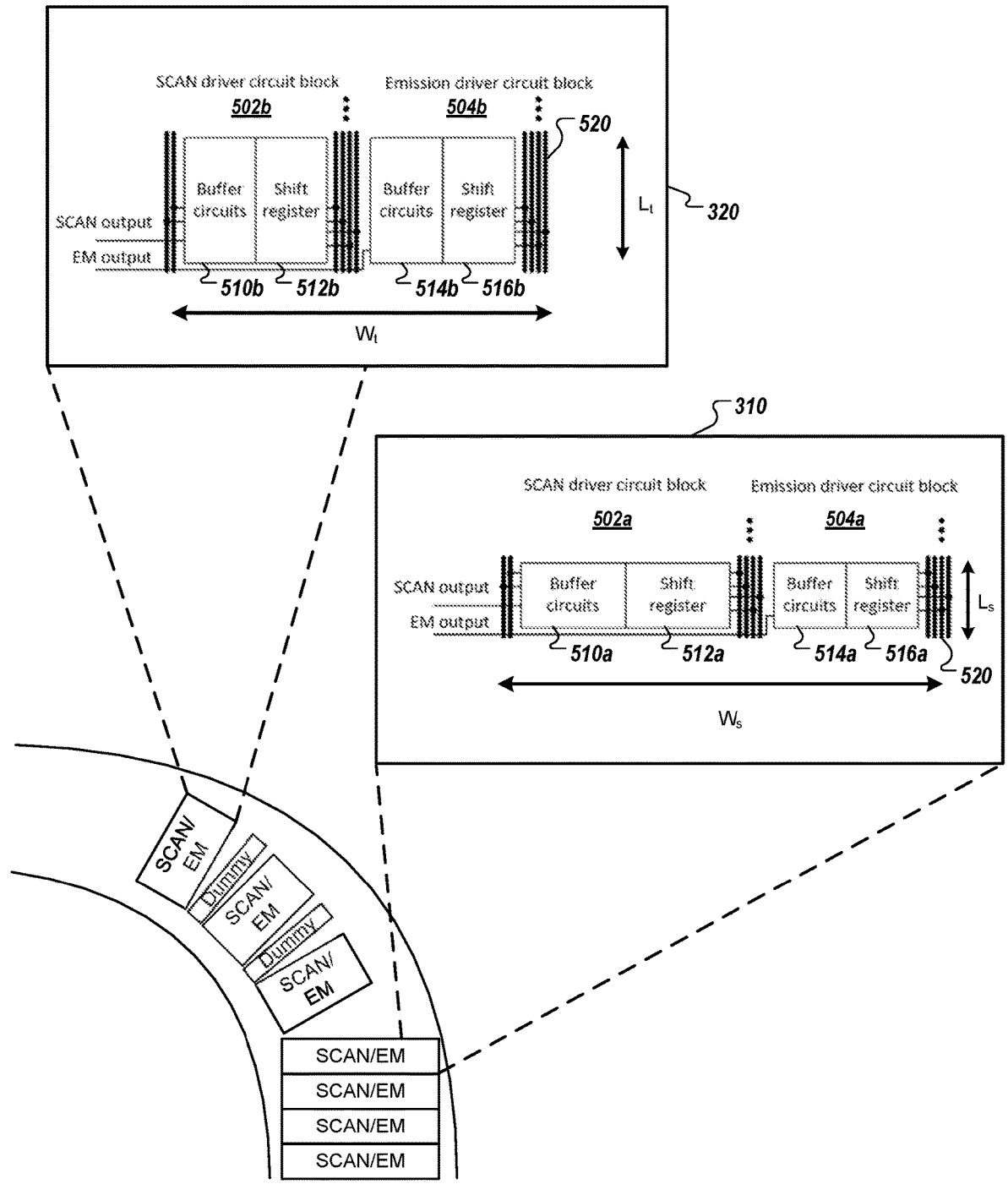
FIG. 5 illustrates example circuits of a side scan/emission driver and a corner scan/emission driver.

FIG. 5 illustrates example circuits of a side SCAN/EM driver and a corner SCAN/EM driver. The side SCAN/EM driver may be, for example, a side SCAN/EM driver 310 of the display panel 300. The corner SCAN/EM driver may be, for example, a corner SCAN/EM driver 320 of the display panel 300.

Each of the side SCAN/EM driver 310 and the corner SCAN/EM driver 320 include a SCAN driver circuit block 502*a*, 502*b*, and an emission driver circuit block 504*a*, 504*b*. The SCAN driver circuit blocks 502*a*, 502*b*, each include buffer circuits 510*a*, 510*b*, and shift registers 512*a*, 512*b*. The emission driver circuit blocks 504*a*, 504*b* each include buffer circuits 514*a*, 514*b* and shift registers 516*a*, 516*b*. The SCAN/EM driver 310 and the corner SCAN/EM driver 320 each include wiring 520 that provides clock signals, start pulses, and power to the drivers. The SCAN/EM drivers 310, 320 each supply scan signals and emission signals to a rows of pixels.

The SCAN driver circuit block 502*b* is arranged such that the buffer circuits 510*b* and the shift register 512*b* are longer in length, and shorter in width, compared to the buffer circuits 510*a* and the shift register 512*a*. Similarly, the emission driver circuit block 504*b* is arranged such that the buffer circuits 514*b* and the shift register 516*b* are longer in length, and shorter in width, compared to the buffer circuits 514*a* and the shift register 516*a*. As a result, the width $W_t$ of the corner SCAN/EM driver 320 is less than the width $W_s$ of the side SCAN/EM driver 310. Additionally, the length $L_t$ of the corner SCAN/EM driver 320 is greater than the length $L_s$ of the side SCAN/EM driver 310. Thus, though the corner SCAN/EM driver 320 and the side SCAN/EM driver 310 include similar components and perform similar functions, the arrangements of the component circuitry results in differences between the sizes of the drivers, so that corner bezel width can be reduced.

Embodiments of the subject matter and the functional operations described in this specification can be implemented in any suitable electronic device such as a personal computer, a mobile telephone, a smart phone, a smart watch, a smart TV, a mobile audio or video player, a game console, or a combination of one or more of these devices.

The electronic device may include various components such as a memory, a processor, a display, and input/output units. The input/output units may include, for example, a transceiver which can communicate with the one or more networks to send and receive data. The display may be any suitable display including, for example, a cathode ray tube (CRT), liquid crystal display (LCD), or light emitting diode (LED) display, for displaying images.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Embodiments may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A display panel, comprising:
    an array of pixels extending in a plane and arranged in rows extending in a row direction, wherein a first plurality of rows extends to an edge of the pixel array, one or more rows at a corner of the pixel array are recessed from the edge of the pixel array, and one or more intervening rows are positioned in between the first plurality of rows and the one or more rows at the corner of the pixel array;
    a plurality of driver circuits each connected to a corresponding row of the pixel array and occupying a corresponding area in the plane, the corresponding area having a long dimension and a short dimension orthogonal to the long dimension, wherein:
        the plurality of driver circuits comprises a first set of driver circuits, a second set of driver circuits, and an intervening set of driver circuits,
        driver circuits of the first set are connected to corresponding rows of the first plurality of rows, an orientation of the long dimension of each driver circuit of the first set being parallel to the row direction,
        driver circuits of the second set are connected to corresponding rows of the one or more rows at the corner of the pixel array recessed from the edge, an orientation of the long dimension of each driver circuit of the second set being offset from the row direction by a non-zero angle,
        driver circuits of the intervening set are connected to corresponding rows of the one or more intervening rows,
        the long dimension of each of the driver circuits of the first set is greater than the long dimension of each of the driver circuits of the second set,
        driver circuits of the intervening set of driver circuits have long dimensions and short dimensions that are different from each other, and
        the long dimension of each of the driver circuits of the intervening set is less than the long dimension of each of the driver circuits of the first set of driver circuits, and greater than the long dimension of each of the driver circuits of the second set of driver circuits; and
    a set of dummy circuits that are not electrically connected to the pixel array, each dummy circuit of the set of dummy circuits being positioned interspersed with the plurality of driver circuits, a spacing between two driver circuits of the plurality of driver circuits being based on a size of one or more dummy circuits between the two driver circuits.

2. The display panel of claim 1, wherein the display panel is housed in a chassis defining a bezel covering the plurality of driver circuits.

3. The display panel of claim 2, wherein a portion of the bezel covering the second set of driver circuits comprises a non-linear edge of the bezel between two linear edges of the bezel.

4. The display panel of claim 1, wherein:
    the pixel array comprises an array of organic light emitting diodes; and
    each driver circuit provides each of a scan signal and an emission signal to the corresponding row of the pixel array.

5. The display panel of claim 1, wherein the short dimension of each of the driver circuits of the first set is less than the short dimension of each of the driver circuits of the second set.

6. A display system comprising:
    an array of light emitting pixels extending in a plane;
    a bezel surrounding the array of light emitting pixels, the bezel comprising a straight region extending in a first direction and a corner region;
    a first set of driver circuits connected to the array of light emitting pixels and located within the straight region; each of the first set of driver circuits occupying an area within the plane defined by a length and a width, an orientation of the length of each driver circuit of the first set being parallel to the first direction;
    a second set of driver circuits connected to the array of light emitting pixels and located within the corner region; each of the second set of driver circuits occupying an area within the plane defined by a length and a width, an orientation of the length of each driver circuit of the second set being offset from the first direction by a non-zero angle;
    an intervening set of driver circuits connected to the array of light emitting pixels and located between the first set of driver circuits and the second set of driver circuits, wherein driver circuits of the intervening set of driver circuits have widths and lengths that are different from each other, wherein the width of each of the second set of driver circuits is less than the width of each of the first set of driver circuits, and the width of each of the intervening set of driver circuits is less than the width of each of the first set of driver circuits and greater than the width of each of the second set of driver circuits; and a set of dummy circuits that are not electrically connected to the pixel array, each dummy circuit of the set of dummy circuits being positioned interspersed with the second set of driver circuits, a spacing between two driver circuits of the second set of driver circuits being based on a size of one or more dummy circuits between the two driver circuits.

7. The display system of claim 6, wherein the array of light emitting pixels is arranged in a plurality of rows, wherein each driver circuit of the first set of driver circuits and the second set of driver circuits is connected to a corresponding row of the array of light emitting pixels.

8. The display system of claim 6, wherein the length of each driver circuit of the first set of driver circuits and the second set of driver circuits is shorter than the width of the driver circuit.

9. The display system of claim 6, wherein an orientation of the length of each driver circuit of the first set of driver circuits and the second set of driver circuits is orthogonal to an orientation of the width of the driver circuit.

10. The display system of claim 6, wherein the first set of driver circuits and the second set of driver circuits each include driver circuits providing each of a scan signal and an emission signal to a portion of the array of light emitting pixels.

11. The display system of claim 6, wherein the array of light emitting pixels comprises an array of organic light emitting diodes.

12. The display system of claim 6, wherein the corner region comprises a curved region of the bezel between the straight region of the bezel and a second straight region of the bezel.

13. A mobile device, comprising:
a housing; and
a display panel, comprising:
an array of pixels extending in a plane and arranged in rows extending in a row direction, wherein a first plurality of rows extends to an edge of the pixel array, one or more rows at a corner of the pixel array are recessed from the edge of the pixel array, and one or more intervening rows are positioned in between the first plurality of rows and the one or more rows at the corner of the pixel array;

a plurality of driver circuits each connected to a corresponding row of the pixel array and occupying a corresponding area in the plane, the corresponding area having a long dimension and a short dimension orthogonal to the long dimension, wherein:
the plurality of driver circuits comprises a first set of driver circuits, a second set of driver circuits, and an intervening set of driver circuits,
driver circuits of the first set are connected to corresponding rows of the first plurality of rows, an orientation of the long dimension of each driver circuit of the first set being parallel to the row direction,
driver circuits of the second set are connected to corresponding rows of the one or more rows at the corner of the pixel array recessed from the edge, an orientation of the long dimension of each driver circuit of the second set being offset from the row direction by a non-zero angle,
driver circuits of the intervening set are connected to corresponding rows of the one or more intervening rows,
the long dimension of each of the driver circuits of the first set is greater than the long dimension of each of the driver circuits of the second set,
driver circuits of the intervening set of driver circuits have long dimensions and short dimensions that are different from each other, and
the long dimension of each of the driver circuits of the intervening set is less than the long dimension of each of the driver circuits of the first set of driver circuits, and greater than the long dimension of each of the driver circuits of the second set of driver circuits; and
a set of dummy circuits that are not electrically connected to the pixel array, each dummy circuit of the set of dummy circuits being positioned interspersed with the plurality of driver circuits, a spacing between two driver circuits of the plurality of driver circuits being based on a size of one or more dummy circuits between the two driver circuits.

14. The mobile device of claim 13, wherein the housing defines a bezel covering the plurality of driver circuits.

15. The mobile device of claim 13, wherein each driver circuit provides each of a scan signal and an emission signal to the corresponding row of the pixel array.

* * * * *